(12) United States Patent
Huang

(10) Patent No.: US 11,492,846 B2
(45) Date of Patent: Nov. 8, 2022

(54) WINDOW BLIND ASSEMBLY HAVING TRANSMISSION ASSIST STRUCTURE

(71) Applicant: TAICANG KINGFU PLASTIC MANUFACTURE CO., LTD., Taicang (CN)

(72) Inventor: Szu-Chang Huang, Fusing Township (TW)

(73) Assignee: TAICANG KINGFU PLASTIC MANUFACTURE CO., LTD., Taicang (CN)

( * ) Notice: Subject to any disclaimer, the term of this patent is extended or adjusted under 35 U.S.C. 154(b) by 254 days.

(21) Appl. No.: 16/941,905

(22) Filed: Jul. 29, 2020

(65) Prior Publication Data

US 2021/0301591 A1    Sep. 30, 2021

(30) Foreign Application Priority Data

Mar. 27, 2020  (CN) .......................... 202020425256.8

(51) Int. Cl.
| | |
|---|---|
| *E06B 9/80* | (2006.01) |
| *F16D 67/02* | (2006.01) |
| *E06B 9/327* | (2006.01) |
| *E06B 9/322* | (2006.01) |
| *E06B 9/264* | (2006.01) |

(52) U.S. Cl.
CPC .............. *E06B 9/80* (2013.01); *E06B 9/327* (2013.01); *F16D 67/02* (2013.01); *E06B 9/264* (2013.01); *E06B 2009/3222* (2013.01)

(58) Field of Classification Search
CPC ... E06B 9/28; E06B 9/30; E06B 9/322; E06B 9/264; E06B 9/327; E06B 9/80; E06B 9/62; E06B 2009/2643; E06B 2009/3222; E06B 2009/807; F16D 67/02

See application file for complete search history.

(56) References Cited

U.S. PATENT DOCUMENTS 5,113,922 A * 5/1992 Christensen .............. E06B 9/32
                                                              160/192
5,392,887 A * 2/1995 Nisenson ................ F16D 43/02
                                                              192/16

(Continued)

FOREIGN PATENT DOCUMENTS

| CN | 108643807 A | * | 10/2018 | ............. | E06B 9/264 |
| CN | 108643808 A | * | 10/2018 | ............. | E06B 9/264 |

(Continued)

*Primary Examiner* — Johnnie A. Shablack
(74) *Attorney, Agent, or Firm* — Birch, Stewart, Kolasch & Birch, LLP

(57) ABSTRACT

A window blind assembly includes a frame, an input shaft rotatably disposed in the frame, a blind unit, a winding unit for placing the blind unit in a retracted state when the input shaft is rotated in a first rotational direction and for shifting the blind unit to an expanded state when the input shaft is rotated in a second rotational direction, a control unit operable to drive rotation of the input shaft in the first and second rotational directions, a force-assisting unit having a spring capable of exerting a spring force on the control unit to resist the weight of the blind unit acting thereon, and a brake unit connected to the input shaft and generating a frictional force to resist rotation of the input shaft in the second rotational direction.

8 Claims, 8 Drawing Sheets

(56) References Cited

U.S. PATENT DOCUMENTS

| | | | | |
|---|---|---|---|---|
| 6,817,401 B2* | 11/2004 | Sun | ............. | E06B 9/304 160/176.1 R |
| 7,124,803 B2* | 10/2006 | Jin | ............. | E06B 9/264 160/107 |
| 7,337,824 B2* | 3/2008 | Berger | ............. | E06B 9/264 160/107 |
| 7,669,633 B2* | 3/2010 | Berger | ............. | E06B 9/30 160/107 |
| 8,220,521 B2* | 7/2012 | Tischer | ............. | B64C 1/1484 160/90 |
| 8,499,815 B2* | 8/2013 | Zhang | ............. | E06B 9/322 160/176.1 R |
| 8,550,141 B2* | 10/2013 | Ding | ............. | E06B 9/264 160/176.1 R |
| 8,616,260 B2* | 12/2013 | Zhang | ............. | E06B 9/264 160/170 |
| 9,004,143 B2* | 4/2015 | Wilson | ............. | E06B 3/6715 160/107 |
| 9,121,220 B2* | 9/2015 | Zhang | ............. | E06B 9/264 |
| 9,732,555 B2* | 8/2017 | Morris | ............. | E06B 9/322 |
| 9,976,344 B2* | 5/2018 | Nicolosi | ............. | E06B 9/78 |
| 11,293,219 B2* | 4/2022 | Zhang | ............. | E06B 9/264 |
| 2006/0118250 A1* | 6/2006 | Jin | ............. | E06B 9/264 160/107 |
| 2008/0029226 A1* | 2/2008 | Huang | ............. | E06B 9/264 160/107 |
| 2008/0283200 A1* | 11/2008 | Hummel | ............. | E06B 9/264 160/90 |
| 2012/0132374 A1* | 5/2012 | Lee | ............. | E06B 9/264 160/98 |
| 2014/0048219 A1* | 2/2014 | Knowles | ............. | B64C 1/1492 160/331 |
| 2016/0290043 A1* | 10/2016 | McPherson, Jr. | ............. | E06B 9/78 |
| 2017/0081914 A1* | 3/2017 | Wu | ............. | E06B 9/327 |
| 2017/0218700 A1* | 8/2017 | Lin | ............. | E06B 9/80 |
| 2017/0260804 A1* | 9/2017 | Wu | ............. | E06B 9/68 |
| 2021/0131174 A1* | 5/2021 | Zhang | ............. | E06B 9/264 |
| 2021/0301591 A1* | 9/2021 | Huang | ............. | E06B 9/80 |
| 2022/0112763 A1* | 4/2022 | Hummel | ............. | E06B 9/303 |

FOREIGN PATENT DOCUMENTS

| | | | | |
|---|---|---|---|---|
| CN | 108661525 A | * | 10/2018 | ............. E06B 3/66 |
| CN | 108661527 A | * | 10/2018 | ............. E06B 3/66 |
| CN | 108678637 A | * | 10/2018 | ............. E06B 9/264 |
| CN | 109025764 A | * | 12/2018 | ............. E06B 3/673 |
| CN | 208885164 U | * | 5/2019 | ............. E06B 9/264 |
| CN | 113006673 A | * | 6/2021 | ............. E06B 9/264 |

* cited by examiner

US 11,492,846 B2

WINDOW BLIND ASSEMBLY HAVING TRANSMISSION ASSIST STRUCTURE

CROSS-REFERENCE TO RELATED APPLICATION

This application claims priority from Chinese Patent Application No. 202020425256.8, filed on Mar. 27, 2020.

FIELD

The disclosure relates to a window blind assembly having a transmission assist structure.

BACKGROUND

A hollow glass with built-in blinds, as disclosed in Chinese Patent Publication No. 108643807A, includes a window body including four frame plates, an inner glass connected to a front side of the window body, an outer glass connected to a rear side of the window body and parallel to the inner glass, a Venetian blind disposed between the inner glass and the outer glass, a lift cord device connected to the Venetian blind, and a control mechanism disposed inside one of the frame plates for driving the lift cord device. The control mechanism includes an iron plate, and a slide block magnetically attracted to the iron plate and slidable up and down in the one of the frame plates. The control mechanism is operated to move the slide block up and down within the one of the frame plates, thereby driving the lift cord device to wind and unwind so as to retract and expand the Venetian blinds.

Although the aforesaid hollow glass with built-in blinds 1 can achieve its intended purpose, when the Venetian blind is pulled upward to a folded state, slats of the Venetian blind will gradually overlap and the gravity applied to the lift cord device will gradually increase, so that the magnetic force of the control mechanism is insufficient and cannot successfully complete the folding of the Venetian blinds. Or, after the Venetian blind is completely retracted, it is likely to fall down due to excessive weight.

SUMMARY

Therefore, an object of the present disclosure is to provide a window blind assembly that is capable of alleviating at least one of the drawbacks of the prior art.

Accordingly, a window blind assembly of this disclosure includes a frame, an input shaft rotatably disposed in the frame, a blind unit including a plurality of slats disposed horizontally in the frame, a winding unit, a control unit, a force-assisting unit, and a brake unit. The winding unit is connected to the input shaft and the blind unit for pulling upward the slats to place the blind unit in a retracted state when the input shaft is rotated in a first rotational direction and for lowering the slats to shift the blind unit to an expanded state when the input shaft is rotated in a second rotational direction opposite to the first rotational direction. The control unit is disposed in the frame and is connected to the input shaft. The control unit is operable to drive rotation of the input shaft in the first rotational direction and the second rotational direction. The force-assisting unit is connected to the control unit, and includes a spring capable of exerting a spring force on the control unit to resist the weight of the slats acting on the control unit. The spring force of the spring gradually increases when the blind unit is moved to the retracted state and gradually decreases when the blind unit is moved to the expanded state. The brake unit is connected to the input shaft and generates a frictional force to resist rotation of the input shaft in the second rotational direction.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
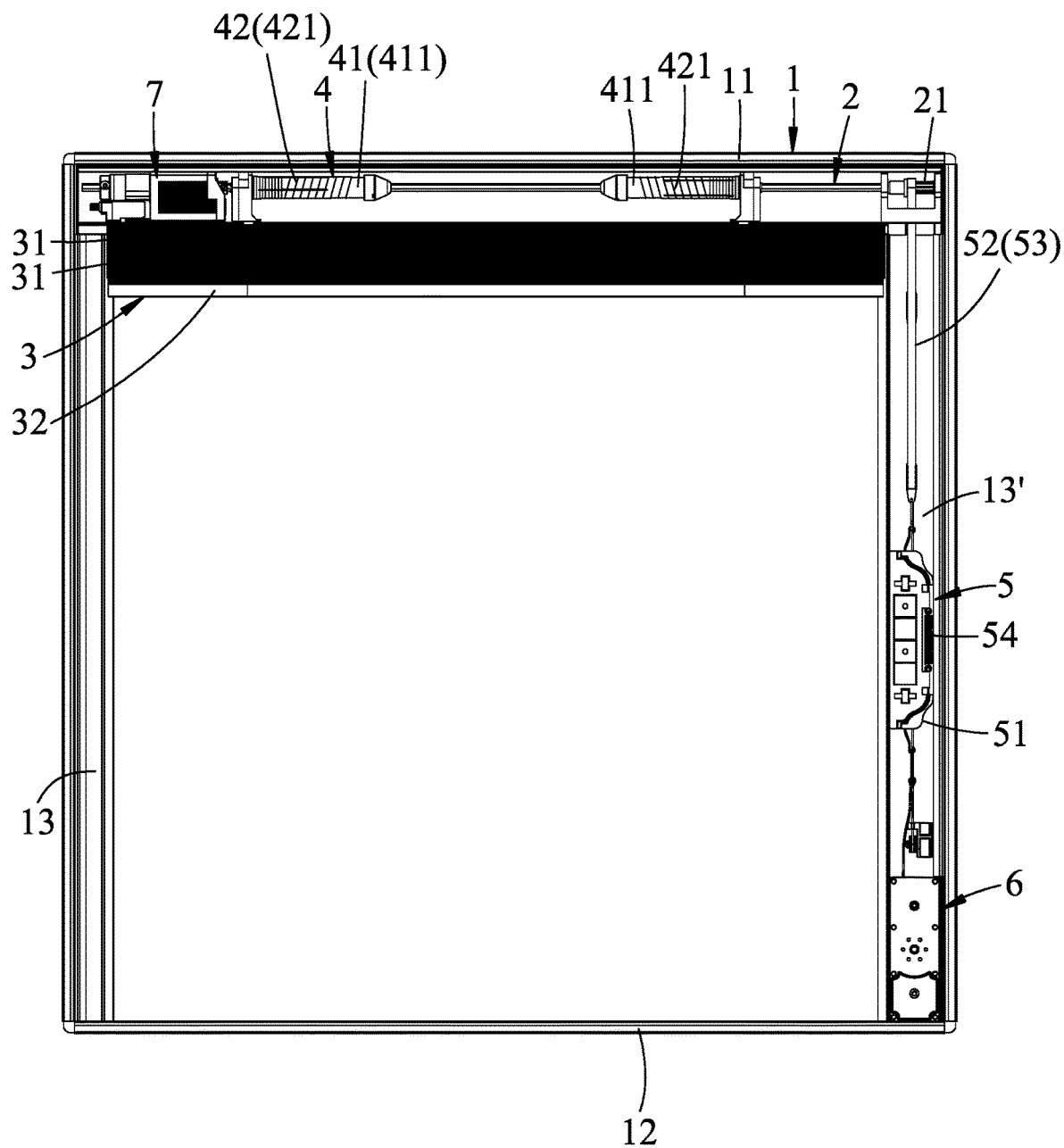
FIG. 1 is a rear view of a window blind assembly according to the embodiment of the present disclosure.
Figure 2:
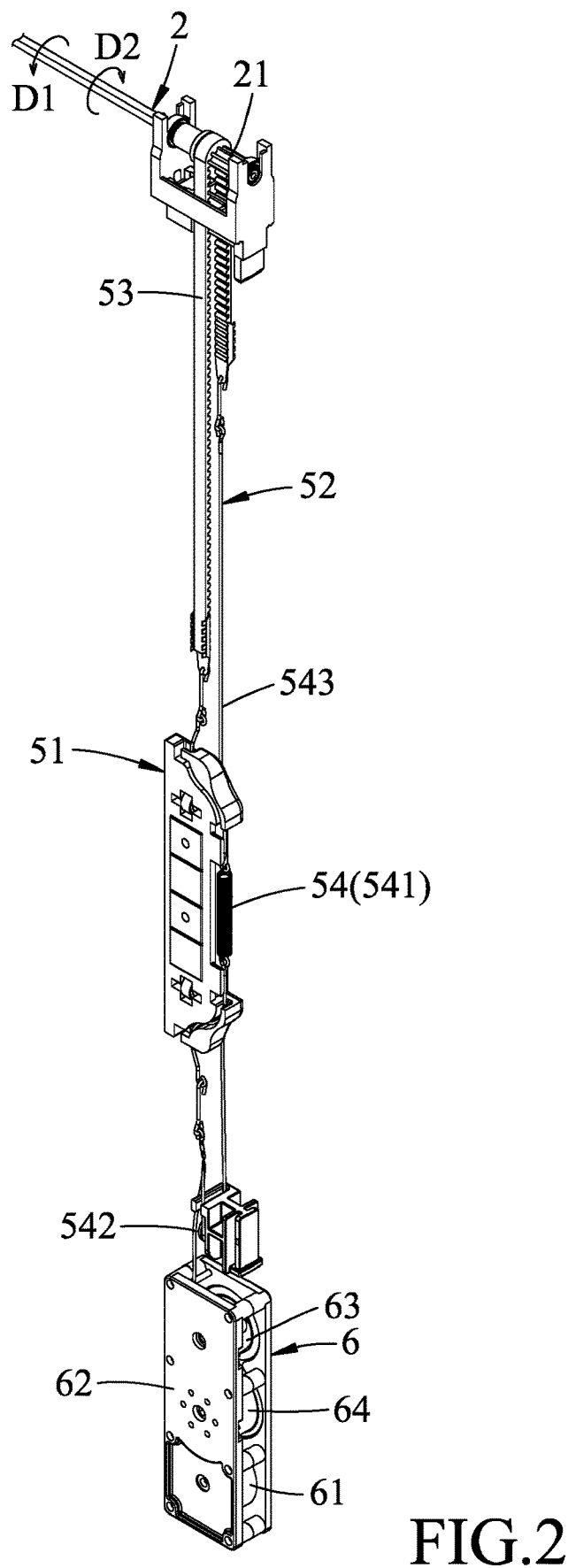
FIG. 2 is a perspective view, illustrating an assembly of an input shaft, a control unit and a force-assisting unit of the embodiment.

Referring to FIGS. 1 and 2, a window blind assembly according to the embodiment of the present disclosure includes a frame 1, an input shaft 2, a blind unit 3, a winding unit 4, a control unit 5, a force-assisting unit 6 and a brake unit 7.

The frame 1 includes a horizontal upper frame plate 11, a horizontal lower frame plate 12, a left vertical frame plate 13 connected to left ends of the upper and lower frame plates 11, 12, and a right vertical frame plate 13' connected to right ends of the upper and lower frame plates 11, 12.

The input shaft 2 is rotatably disposed in the upper frame plate 11, and has one end provided with a gear set 21.

The blind unit 3 includes a plurality of slats 31 disposed horizontally in the frame 1, and a bottom rail 32 located on the bottom of the slats 31.

The winding unit 4 is connected to the input shaft 2 and the blind unit 3. When the input shaft 2 is rotated in a first rotational direction (D1), the winding unit 4 pulls upward the slats 31 to place the blind unit 3 in a retracted state; and when the input shaft 2 is rotated in a second rotational direction (D2) which is opposite to the first rotational direction (D1), the winding unit 4 releases the slats 31 to shift the blind unit 3 from the retracted state to an expanded state. Specifically, the winding unit 4 includes a cord winding mechanism 41 connected to the input shaft 2, and a pull cord set 42 connected to the blind unit 3 and the cord winding mechanism 41. In this embodiment, the pull cord set 42 includes two pull cords 421 connected to the cord winding mechanism 41 and extending through the slats 31 to connect with the bottom rail 32. The cord winding mechanism 41 includes two cord winding drums 411 sleeved on the input shaft 2 and rotatable along with the same to wind or release the pull cords 421 so as to retract or expand the blind unit 3. However, the structures of the cord winding mechanism 41 and the pull cord set 42 are not limited to what is disclosed herein.

The control unit 5 is disposed on the right vertical frame plate 13', as shown in FIG. 1, but is not limited thereto. The control unit 5 is connected to the input shaft 2, and is operable to drive rotation of the input shaft 2 in the first and second rotational directions (D1, D2). The control unit 5 includes a slide block 51 movably disposed in the right vertical frame plate 13', an external operating member (not shown) disposed on an outer side of the frame 1 and operable to control up and down movement of the slide block 51 in the right vertical frame plate 13', and a transmission set 52 connected to the slide block 51 and the input shaft 2. The transmission set 52 includes a transmission belt 53, and a tension mechanism 54 connected to the transmission belt 53 and the slide block 51 for maintaining the tension of the transmission belt 53. In this embodiment, the slide block 51 and the external operating member are magnetically attracted to each other, and the transmission belt 53 is a toothed belt that meshes with the gear set 21.

The tension mechanism 54 includes a spring 541, a pulley 542, and a drive rope 543. The drive rope 543 is connected to the transmission belt 53, the spring 541, the slide block 51, and passes over the pulley 541, so that the tension mechanism 54 and the transmission belt 53 form a transmission loop. Through this, the external operating member can be operated to drive up and down movement of the slide block 51, which in turn drives the transmission belt 53 to rotate the input shaft 2. Further, through the tension mechanism 54, the tension of the transmission belt 53 can be maintained so as to enhance the transmission efficiency.

Figure 3:
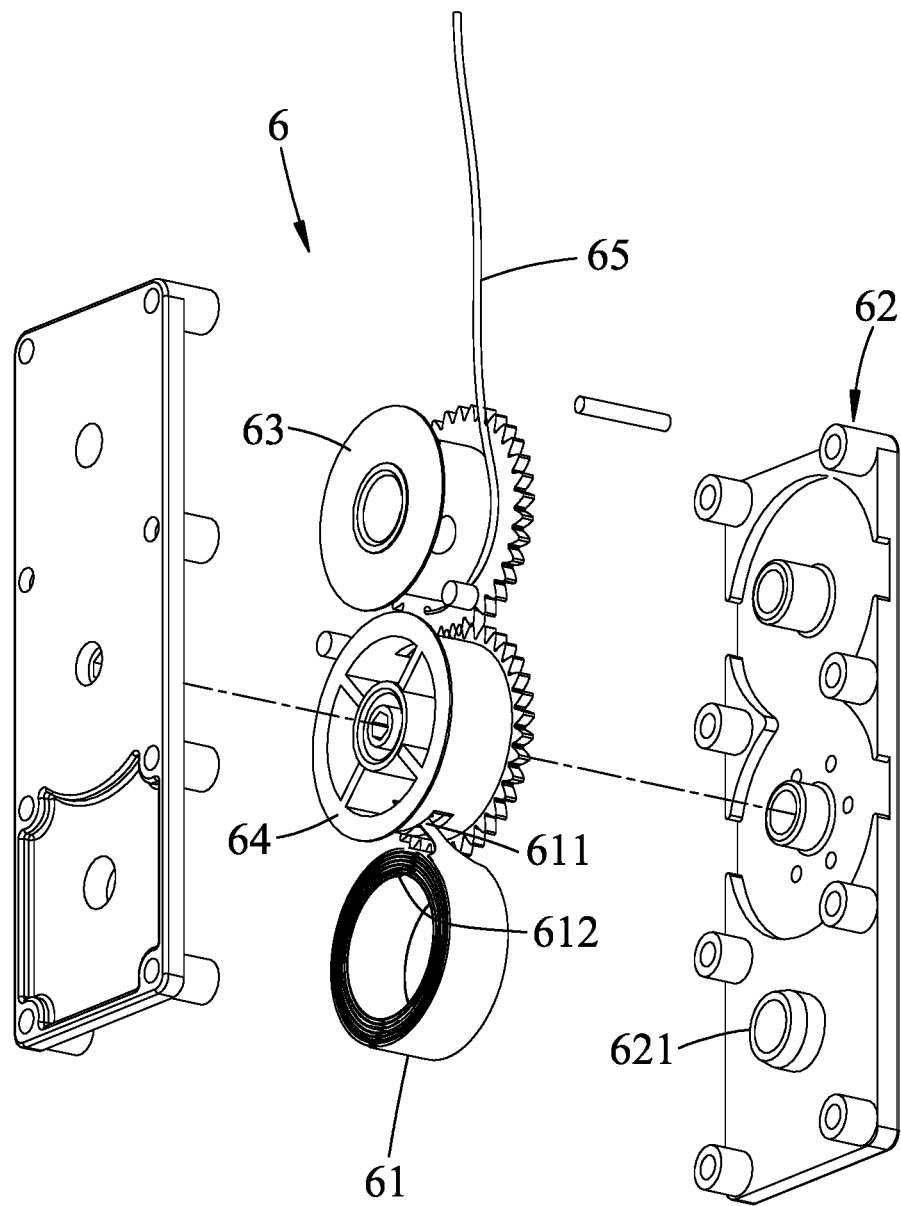
FIG. 3 is an exploded perspective view of the force-assisting unit of the embodiment.

Referring to FIG. 3, in combination with FIGS. 1 and 2, the force-assisting unit 6 is connected to the control unit 5, and includes a spring 61 capable of exerting a spring force on the control unit 5 to resist the weight of the slats 31 acting on the control unit 5. When the blind unit 3 is moved upward to the retracted state, the spring force of the spring 61 gradually increases; and when the blind unit 3 is moved to the expanded state, the spring force of the spring 61 gradually reduces.

The force-assisting unit 6 further includes a casing 62 disposed on a bottom end of the right vertical frame plate 13' and located below the control unit 5, a rope winding gear 63 rotatably disposed in the casing 62, a spring gear 64 rotatably disposed in the casing 62 and meshing with the rope winding gear 63, and a connecting rope 65 having two ends respectively fixed to the control unit 5 and the rope winding gear 63. The casing 62 has a protruding post 621 (see FIG. 3). The spring 61 is an S-shaped variable force coil spring movably sleeved on the protruding post 621, and has a head end 611 fixed to the spring gear 64, and a tail end 612 opposite to the head end 611 and adjacent to the protruding post 621. The head end 611 has the greatest elasticity, while the tail end 612 has the least elasticity. The spring 61 can be driven by the spring gear 64 to wind around the same. When the slide block 51 moves down and drives the blind unit 3 to move upward to the retracted state, the spring 61 winds itself around the protruding post 621; and, when the slide block 51 moves up and drives the blind unit 3 to move downward to the expanded state, the head end 611 of the spring 61 is pulled by the spring gear 64 to wind the spring 61 around the spring gear 64.

Referring to FIG. 1, the brake unit 7 is disposed in the upper frame plate 11, and is connected to the other opposite end of the input shaft 2. When the blind unit 3 is in a complete retracted state, the brake unit 7 generates a frictional force to resist rotation of the input shaft 2 in the second rotational direction (D2); and, when the blind unit 3 is moved to an expanded state, the frictional force of the brake unit 7 gradually reduces.

Figure 4:
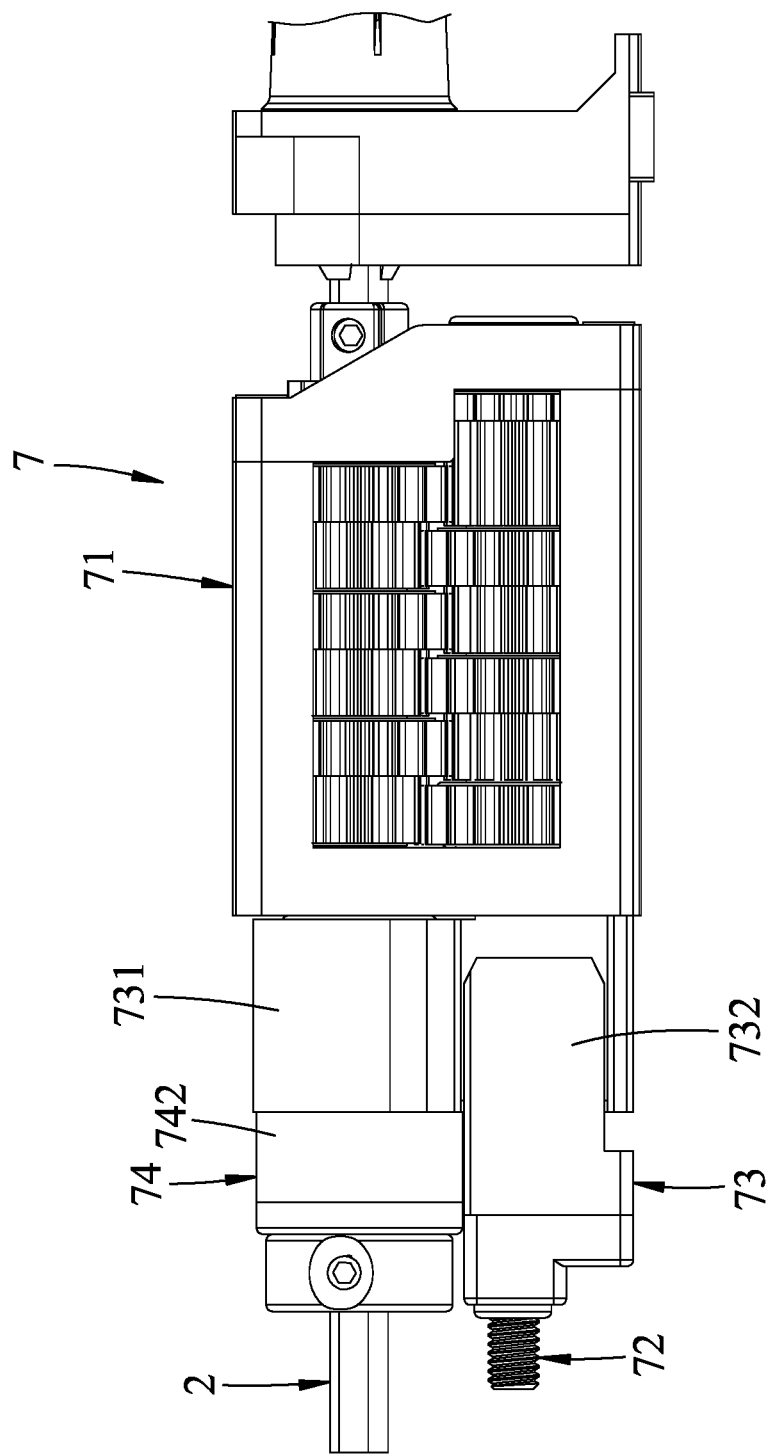
FIG. 4 is a fragmentary rear view of an assembly of the input shaft and a brake unit of the embodiment.
Figure 5:
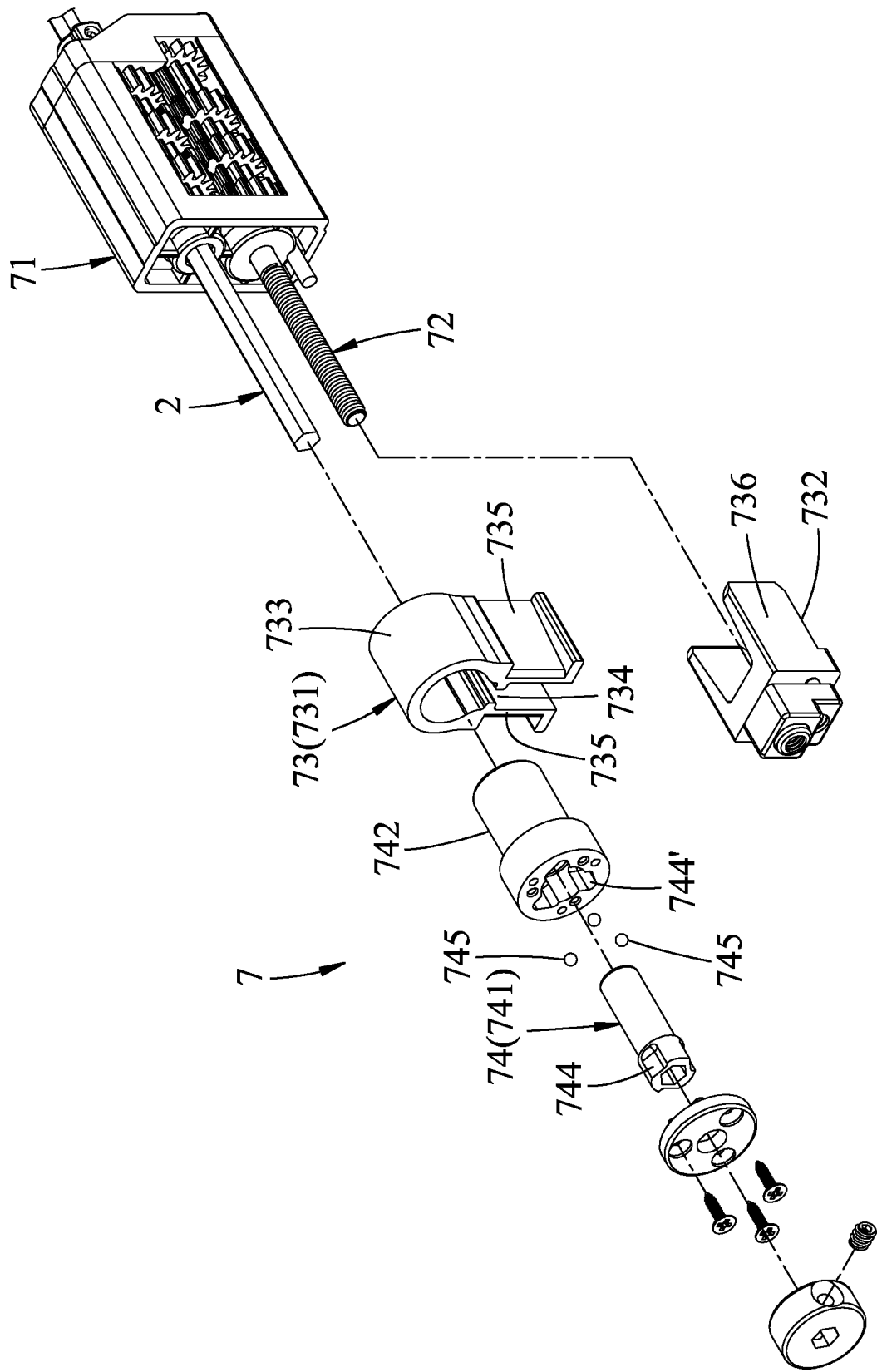
FIG. 5 is a partially exploded perspective view of the brake unit of the embodiment.
Figure 6:
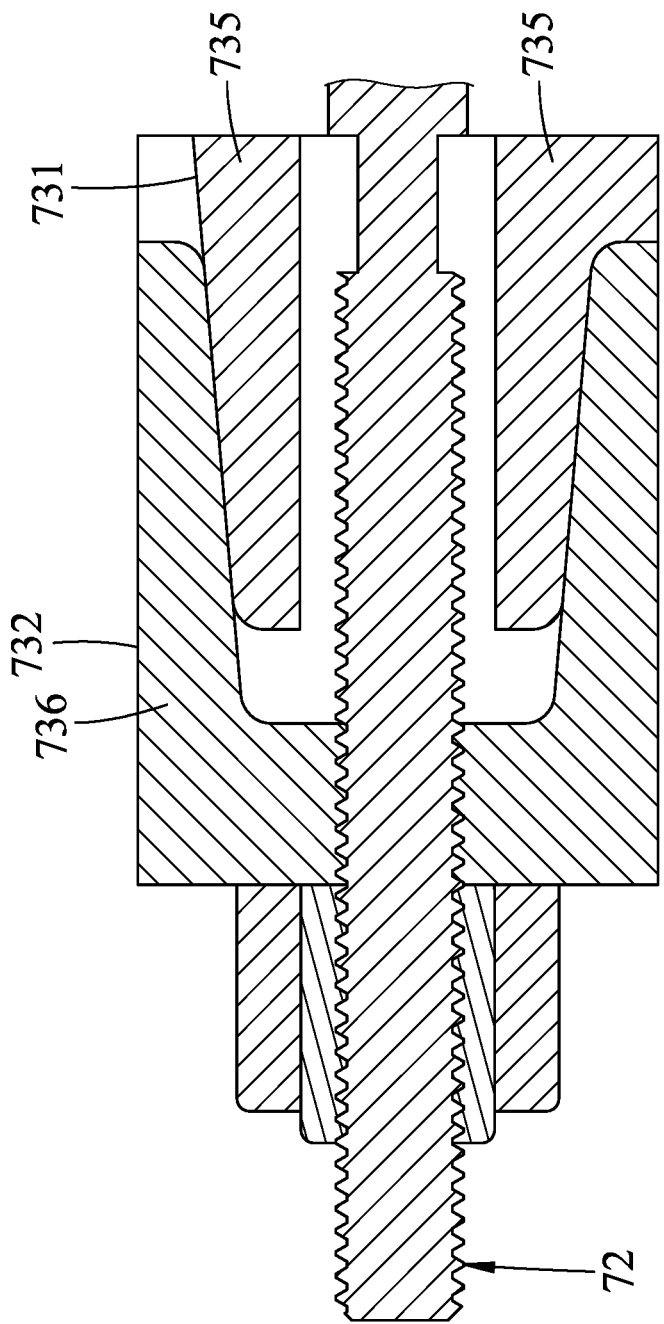
FIG. 6 is an enlarged sectional view of a brake set of the brake unit of the embodiment.

Referring to FIGS. 5 and 6, in combination with FIG. 4, in this embodiment, the brake unit 7 includes a gearbox 71 connected to the input shaft 2, an output shaft 72 connected to the gearbox 71 and rotatable along with the input shaft 2, a brake set 73 connected to the output shaft 72, and a clutch mechanism 74 connected to the input shaft 2 and the brake set 73. The gearbox 71 includes a plurality of gears, and is used for reducing a rotational speed of the output shaft 72, so that the rotational speed of the output shaft 72 is less than that of the input shaft 2. The brake set 73 is used for braking. The clutch mechanism 74 is used for connecting and disconnecting the input shaft 2 and the brake set 73.

When the input shaft 2 rotates in the first rotational direction (D1), the output shaft 72 drives the brake set 73 to gradually act on the clutch mechanism 74, such that the input shaft 2 and the brake set 73 are disconnected, and rotation of the input shaft 2 is not affected by the brake set 73. When the input shaft 2 rotates in the second rotational direction (D2), the output shaft 72 drives the brake set 73 to gradually reduce its act on the clutch mechanism 74, such that the input shaft 2 and the brake set 73 are connected, and the rotation of the input shaft 2 is affected by the brake set 73.

Figure 7:
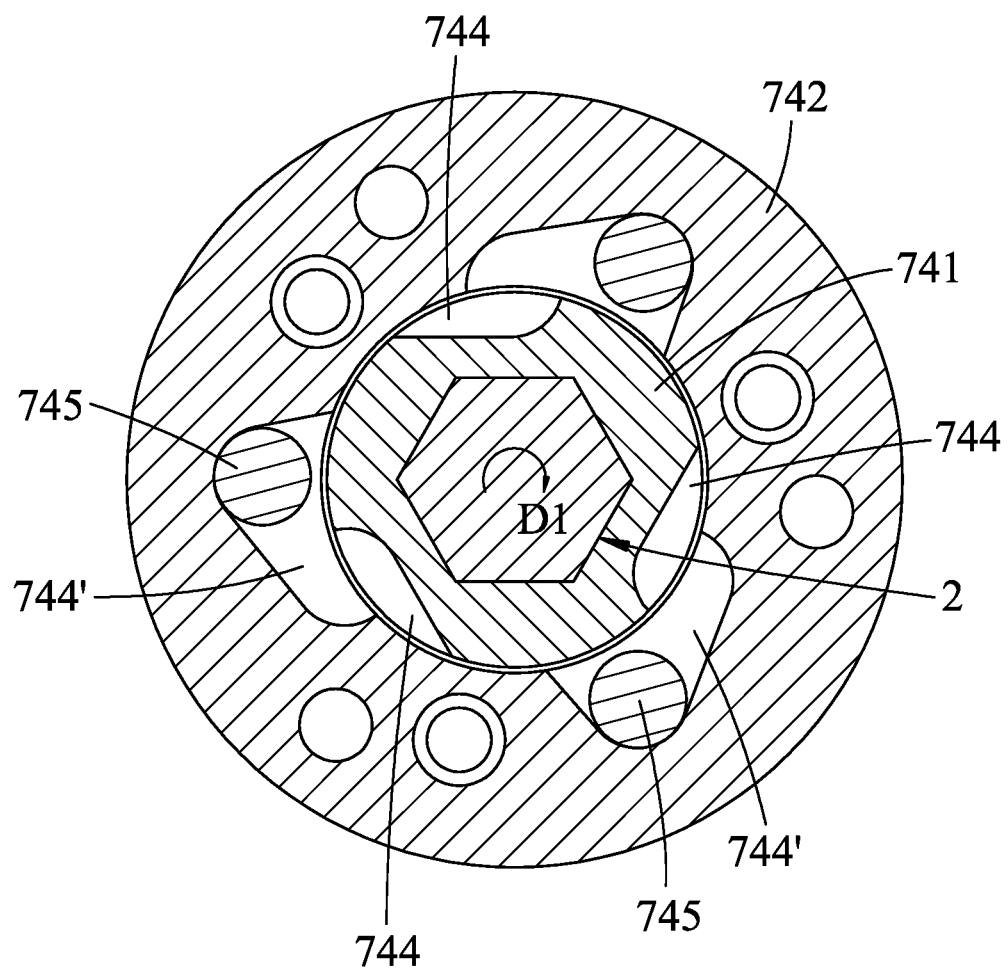
FIG. 7 is a sectional view of a clutch mechanism of the brake unit and the input shaft of the embodiment.
Figure 8:
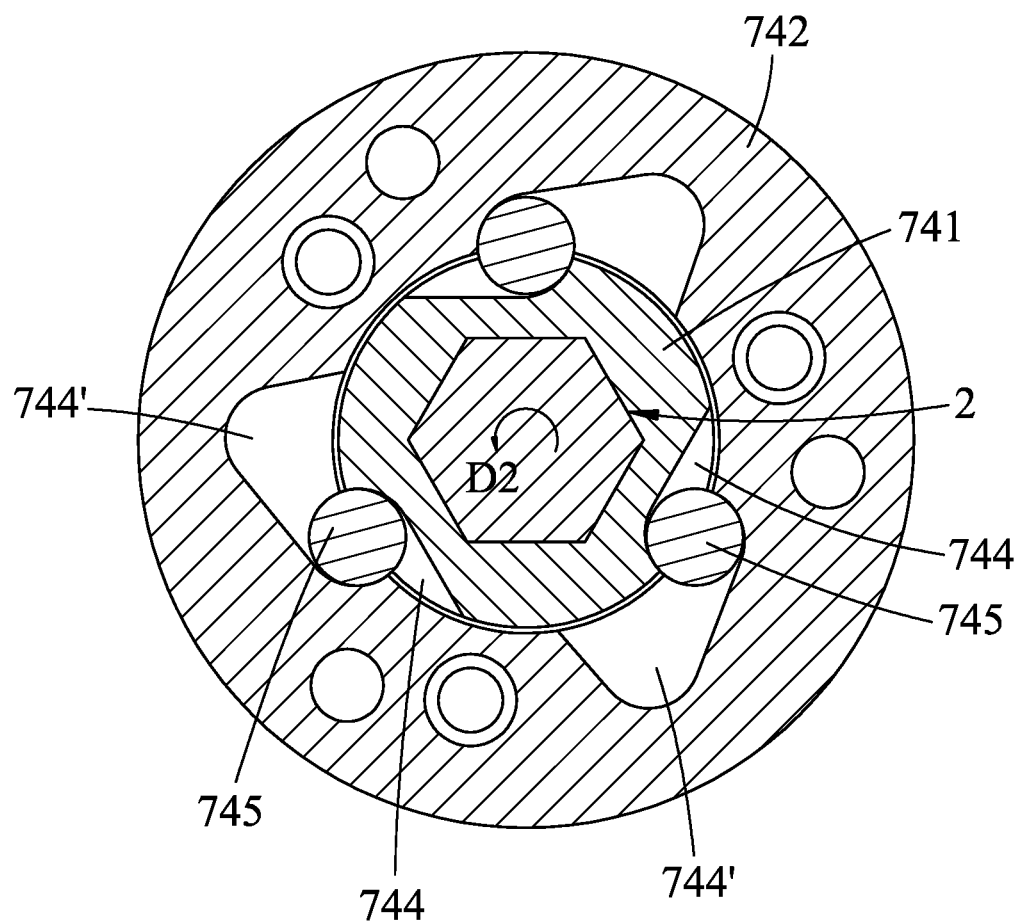
FIG. 8 is a view similar to FIG. 7, but illustrating an inner tubular member and an outer tubular member of the clutch mechanism connected to each other.

Specifically, referring to FIGS. 7 and 8, in combination with FIG. 5, the clutch mechanism 74 includes an inner tubular member 741 sleeved on the input shaft 2, an outer tubular member 742 sleeved on the inner tubular member 741, and a connecting structure 743 disposed between the inner tubular member 741 and the outer tubular member 742 for connecting and disconnecting the inner and outer tubular members 741, 742. In this embodiment, the connecting structure 743 includes three angularly spaced-apart recesses 744 provided on an outer surface of the inner tubular member 741 in proximity to one end thereof, three angularly spaced-apart recesses 744' provided on an inner surface of the outer tubular member 742 in proximity to one end thereof, and three rolling balls 745 each of which is disposed between one of the recesses 744 and a corresponding one of the recesses 744'.

When the inner tubular member 741 rotates along with the input shaft 2 in the first rotational direction (D1) (see FIG. 7), the rolling balls 745 are respectively located in the recesses 744', so that the inner and outer tubular members 741, 742 are disconnected from each other. When the inner tubular member 741 rotates along with the input shaft 2 in the second rotational direction (D2) (see FIG. 8), each rolling ball 745 is disposed between one of the recesses 744 and the corresponding recess 744', so that the inner and outer tubular members 741, 742 are connected to each other and rotate together.

With reference to FIGS. 5 and 6, the brake set 73 includes a tubular brake ring 731 sleeved on the outer tubular member 742, and a fastening piece 732 threadedly connected to the output shaft 72. The brake ring 731 includes an embracing portion 733 surrounding the outer tubular member 742 and having a cutout portion 734, and a pair of clamping portions 735 connected to and extending downwardly from two opposite ends of the cutout portion 734. The fastening piece 732 has a substantially U-shaped press portion 736 sleeved on the clamping portions 735. The press portion 736 has an inner tapered surface matching outer tapered surfaces of the clamping portions 735.

When the input shaft 2 rotates in the first rotational direction (D1), the output shaft 72 drives the press portion 736 to approach and sleeve tightly on the clamping portions 735 so as to gradually push the clamping portions 735 toward each other, thereby driving the embracing portion 733 to gradually and tightly embrace the outer tubular member 742 and simultaneously permitting the inner tubular member 741 to rotate relative to the outer tubular member 742. When the input shaft 2 rotates in the second rotational direction (D2), the output shaft 72 drives the press portion 736 to gradually move away from the clamping portions 735 so as to gradually move the clamping portions 735 away from each other, thereby gradually loosening embrace of the embracing portion 733 on the outer tubular member 742 and simultaneously permitting rotation of the outer tubular member 742 together with the inner tubular member 741 relative to the brake ring 733.

With reference to FIGS. 1 to 3 and 5, the operation of the present disclosure will be described below.

To raise the blind unit 3 to a retracted state, the external operating member (not shown) is operated to move the slide block 51 downward so as to urge the transmission belt 53 to drive the input shaft 2 to rotate in the first rotational direction (D1). At this time, the spring 61 of the force-assisting unit 6 is biased to wind itself on the protruding post 621, and the spring force thereof gradually increases to offset at least a portion of the weight of the slats 31 acting on the slide block 51, thereby assisting the slide block 51 to move downward. The output shaft 72 rotates along with the input shaft 2, and drives the press portion 736 to approach and sleeve tightly on the clamping portions 735, so that the embracing portion 733 embraces tightly the outer tubular member 742. Since the inner tubular member 741 is not connected to the outer tubular member 742 at this time, the inner tubular member 741 is driven by the input shaft 2 to rotate therealong in the first rotational direction (D1) (see FIG. 7), and rotation of the input shaft 2 together with the inner tubular member 741 is not affected by the brake set 73. Through this, the input shaft 2 can smoothly rotate in the first rotational direction (D1) to drive the winding unit 4 to wind the pull cords 421 and raise the blind unit 3 to the retracted state.

When the blind unit 3 is in a complete retracted state, the gravitational potential energy of the slats 31 acts on the input shaft 2 with the greatest force, so that the input shaft 2 tends to rotate in the second rotational direction (D2). At this time, the spring force of the spring 61 is the greatest, the inner tubular member 741 and the outer tubular member 742 are connected to each other (see FIG. 8), and the brake ring 731 and the outer tubular member 742 generate therebetween a frictional force that resists rotation of the input shaft 2 in the second rotational direction (D2). Thus, in the absence of an external force, the forces applied by the slats 31, the brake set 73 and the force-assisting unit 6 to the input shaft 2 achieve a balance, so that rotation of the input shaft 2 is stopped, and the slats 31 are prevented from sliding downward.

To shift the blind unit 3 from the retracted state to the expanded state, the external operating member (not shown) is operated to move the slide block 51 upward so as to urge the transmission belt 53 to drive the input shaft 2 to rotate in the second rotational direction (D1). At this time, the gravitational potential energy of the slats 31 is released, and the input shaft 2 overcomes the frictional force generated between the brake set 73 and the outer tubular member 742 and the spring force generated by the spring 61 of the force-assisting unit 6, so that it rotates in the second rotational direction (D2). Simultaneously, the output shaft 72 is driven by the input shaft 2 to rotate therealong, so that the press portion 736 gradually moves away from the clamping portions 735. Thus, the frictional force of the brake unit 7 acting on the input shaft 2 is gradually reduced, and the spring 61 is gradually wound around the spring gear 64 with the spring force thereof gradually reduces. The gravitational potential energy of the slats 31 acting on the input shaft 2 also gradually reduces, so that the slide block 51 can be smoothly operated to shift the blind unit 3 to the expanded state. In an alternative embodiment, the slide block 51 may be operated manually.

In summary, the window blind assembly of this disclosure makes use of the cooperation of the force-assisting unit 6 and the brake unit 7 so that the control unit 5 can smoothly raise and lower the slats 31 of the blind unit 3, and can prevent the slats 31 from falling down due to its own weight when the blind unit 3 is in the retracted state. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A window blind assembly comprising:
    a frame;
    an input shaft rotatably disposed in said frame;
    a blind unit including a plurality of slats disposed horizontally in said frame;
    a winding unit connected to said input shaft and said blind unit for pulling upward said slats to place said blind unit in a retracted state when said input shaft is rotated in a first rotational direction and for lowering said slats to shift said blind unit to an expanded state when said input shaft is rotated in a second rotational direction opposite to the first rotational direction;
    a control unit disposed in said frame and connected to said input shaft, said control unit being operable to drive rotation of said input shaft in the first rotational direction and the second rotational direction;
    a force-assisting unit connected to said control unit and including a spring capable of exerting a spring force on said control unit to resist the weight of said slats acting on said control unit, the spring force of said spring gradually increases when said blind unit is moved to the retracted state and gradually decreases when said blind unit is moved to the expanded state; and
    a brake unit connected to said input shaft and generating a frictional force to resist rotation of said input shaft in the second rotational direction;
    wherein:
        said brake unit includes an output shaft rotatable along with said input shaft, a brake set connected to said output shaft, and a clutch mechanism for connecting and disconnecting said input shaft and said brake set;
        when said input shaft rotates in the first rotational direction, said output shaft drives said brake set to act on said clutch mechanism such that said input shaft and said brake unit are disconnected and rotation of said input shaft is not affected by said brake set; and
        when said input shaft rotates in the second rotational direction, said output shaft drives said brake set to gradually reduce its act on said clutch mechanism such that said input shaft and said brake unit are connected and said brake set and said clutch mechanism generate therebetween the frictional force that resists rotation of said input shaft in the second rotational direction; and when said blind unit is moved to the expanded state, the frictional force of said brake unit gradually reduces.

2. The window blind assembly as claimed in claim 1, wherein:

said clutch mechanism includes an inner tubular member sleeved fixedly on said input shaft, an outer tubular member sleeved on said inner tubular member, and a connecting structure disposed between said inner tubular member and said outer tubular member for connecting and disconnecting said inner tubular member and said outer tubular member;

when said inner tubular member rotates together with said input shaft in the first rotational direction, said inner tubular member and said outer tubular member are disconnected from each other; and when said inner tubular member rotates together with said input shaft in the second rotational direction, said inner tubular member and said outer tubular member are connected to each other.

3. The window blind assembly as claimed in claim 2, wherein:

said brake set includes a tubular brake ring sleeved on said outer tubular member, and a fastening piece threadedly connected to said output shaft, said tubular brake ring including an embracing portion surrounding said outer tubular member and having a cutout portion, and a pair of clamping portions connected to and extending downwardly from two opposite ends of said cutout portion, said fastening piece having a press portion sleeved on said clamping portions, said press portion having an inner tapered surface matching outer tapered surfaces of said clamping portions;

when said input shaft rotates in the first rotational direction, said output shaft drives said press portion to approach and sleeve tightly on said clamping portions so as to gradually push said clamping portions toward each other, thereby driving said embracing portion to gradually and tightly embrace said outer tubular member and simultaneously permitting said inner tubular member to rotate relative to said outer tubular member;

when said input shaft rotates in the second rotational direction, said output shaft drives said press portion to gradually move away from said clamping portions so as to gradually move said clamping portions away from each other, thereby gradually loosening embrace of said embracing portion on said outer tubular member and simultaneously permitting rotation of said outer tubular member together with said inner tubular member relative to said tubular brake ring.

4. The window blind assembly as claimed in claim 1, wherein said brake set includes a gearbox disposed in said frame and connected to said input shaft, said output shaft being connected to said input shaft through said gearbox, said gearbox being configured to reduce a rotational speed of said output shaft such that the rotational speed of said output shaft is less than that of said input shaft.

5. The window blind assembly as claimed in claim 1, wherein said control unit includes a slide block movably disposed in said frame, and a transmission set connected to said slide block and said input shaft, said transmission set including a transmission belt, and wherein, when said slide block is operated by an external force to move up and down in said frame, said slide block drives said transmission belt to rotate said input shaft.

6. The window blind assembly as claimed in claim 5, wherein said transmission set further includes a tension mechanism connected to said transmission belt and said slide block for maintaining the tension of said transmission belt.

7. The window blind assembly as claimed in claim 1, wherein said spring is a variable force coil spring.

8. A window blind assembly comprising:

a frame;

an input shaft rotatably disposed in said frame;

a blind unit including a plurality of slats disposed horizontally in said frame;

a winding unit connected to said input shaft and said blind unit for pulling upward said slats to place said blind unit in a retracted state when said input shaft is rotated in a first rotational direction and for lowering said slats to shift said blind unit to an expanded state when said input shaft is rotated in a second rotational direction opposite to the first rotational direction;

a control unit disposed in said frame and connected to said input shaft, said control unit being operable to drive rotation of said input shaft in the first rotational direction and the second rotational direction;

a force-assisting unit connected to said control unit and including a spring capable of exerting a spring force on said control unit to resist the weight of said slats acting on said control unit, the spring force of said spring gradually increases when said blind unit is moved to the retracted state and gradually decreases when said blind unit is moved to the expanded state; and a brake unit connected to said input shaft and generating a frictional force to resist rotation of said input shaft in the second rotational direction;

wherein said force-assisting unit further includes a casing disposed in said frame and located below said control unit, a rope winding gear rotatably disposed in said casing, a spring gear rotatably disposed in said casing and meshing with said rope winding gear, and a connecting rope having two ends respectively fixed to said control unit and said rope winding gear, said casing having a protruding post, said spring being sleeved on said protruding post and having a head end fixed to said spring gear, and a tail end opposite to said head end and adjacent to said protruding post, said spring being driven by said spring gear to wind therearound.

* * * * *